United States Patent
Holmes

[15] 3,671,760
[45] June 20, 1972

[54] CONDITION MONITORING APPARATUS

[72] Inventor: Oliver W. Holmes, 3321 Rowena Drive, Los Alamitos, Calif. 90720

[22] Filed: April 26, 1971

[21] Appl. No.: 137,204

[52] U.S. Cl. ............................................. 307/116, 340/213
[51] Int. Cl. ....................................................... H01h 35/00
[58] Field of Search ....................... 307/116, 141, 141.4, 113; 340/213, 420; 317/137, 141

[56] References Cited

UNITED STATES PATENTS

| | | | |
|---|---|---|---|
| 3,223,590 | 12/1965 | Troeger | 307/116 X |
| 3,558,909 | 1/1971 | Janson | 307/116 |
| 3,599,591 | 8/1971 | Edelson | 307/116 X |

Primary Examiner—Robert K. Schaefer
Assistant Examiner—William J. Smith
Attorney—Fulwider, Patton, Rieber, Lee & Utecht

[57] ABSTRACT

A condition monitoring apparatus for use by homeowners, small business operators and the like to provide a warning of unauthorized entry, fire, flooding, or other condition change. A variety of detection, sensor, and monitoring devices can be attached to the apparatus as inputs, including both parallel and series connected switches and independent monitoring systems. Certain of the input circuits incorporate a time delay device to delay response to the apparatus to an input condition change. On actuation of the apparatus, a latching relay provides power to a pair of control relays. One control relay remains energized until the latching relay is reset, while the other control relay becomes de-energized after a predetermined time interval. Energization of the control relays is adapted to apply power to various lighting, alarm and indicator devices attached to the apparatus as outputs. The apparatus permits selection of any of a variety of input and output devices to suit the apparatus to the needs of a particular user, with optional on-off control of certain input and output circuits.

6 Claims, 3 Drawing Figures

INVENTOR.
OLIVER W. HOLMES
BY Fulwider, Patton, Rieber
Lee and Utecht
ATTORNEYS

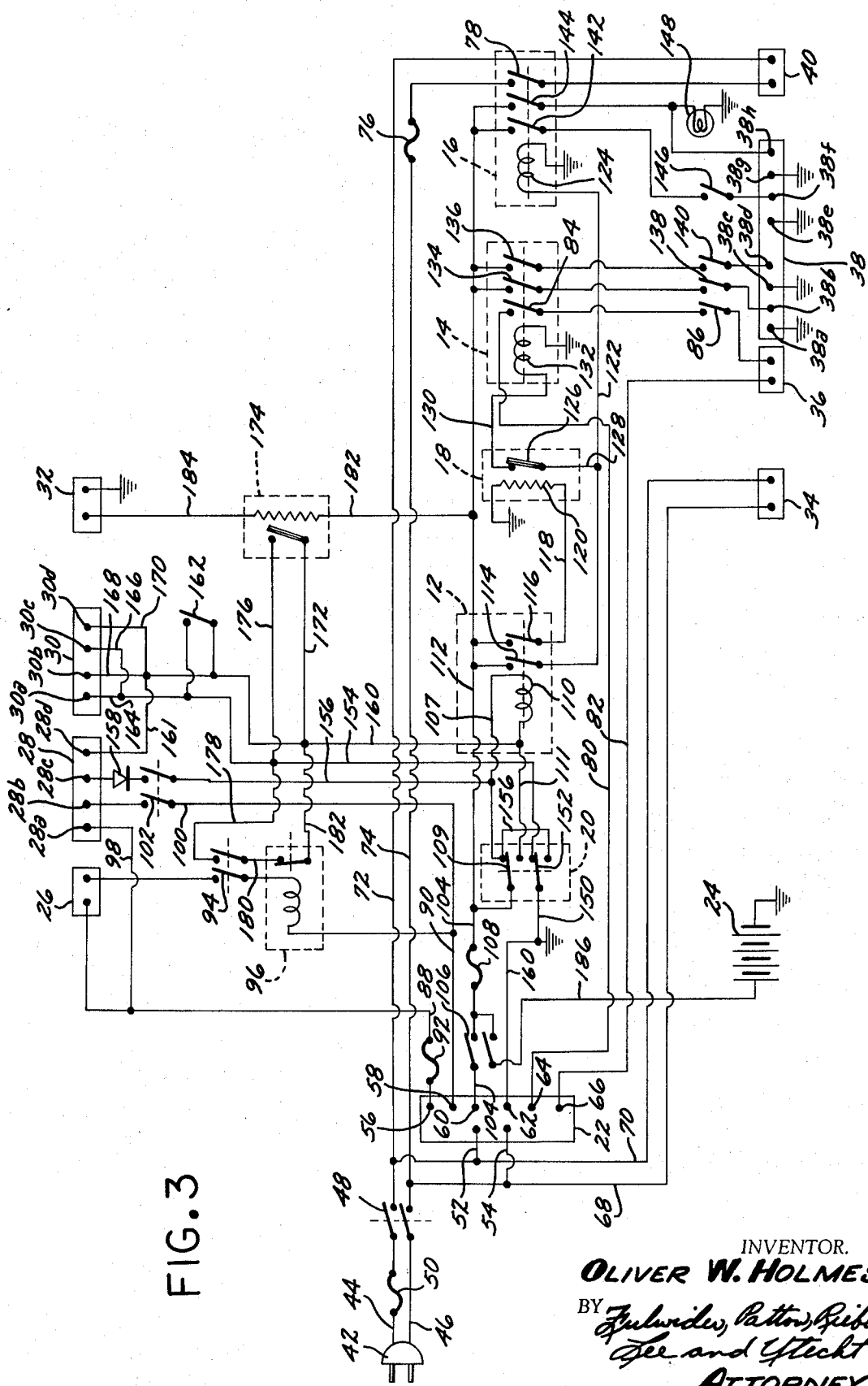

CONDITION MONITORING APPARATUS

BACKGROUND OF THE INVENTION

1. Field of the Invention

The present invention relates to a condition monitoring apparatus and particularly such an apparatus for utilizing a plurality of inputs from various detection, sensor and monitoring devices to actuate one or more output devices alarms and indicators.

2. Description of the Prior Art

There are various burglar alarm and home protection systems available on the market. Usually such systems are either installed by a professional organization which tailors the system to the particular needs of the individual customer, or the system takes the form of a fixed package or plug-in apparatus which the homeowner can install himself. The professionally installed system is ideally suited to the needs of the customer, but it involves an investment which places such an installation out of the reach of the average person. The systems generally available to the homeowner for do-it-yourself installation are usually a compromise intended to fit the needs of most users, but obviously incapable of providing the versatility and flexiblity which some users need. For example, a typical do-it-yourself system may involve a detector for sensing entry of a burglar, but would lack any capability to warn of flooding in the house, presence of smoke or fire, or failure of some appliance such as a freezer, for example. Insofar as applicant is aware, there is no presently available condition monitoring apparatus which is simple to use, relatively uncomplicated and reliable, and adapted for multi-purpose use.

SUMMARY OF THE INVENTION

According to the present invention, a condition monitoring apparatus is provided which is characterized by a plurality of input terminals for accepting inputs from various detection, sensor and monitoring devices, and includes a latching relay actuable by one or more of the inputs to provide power to a plurality of control relays. One of the control relays remains energized until reset means associated with the latching relay are operated, the energized control relay being adapted to apply power to one or more output devices, such as lighting, alarm, or indicator devices. The other control relay is in circuit with time delay means actuable after a predetermined time interval to de-energize such control relay whereby the output devices associated therewith are cut off. The present apparatus is extremely versatile and flexible by reason of the capability for association with any of various types of input and output devices.

Other objects and features of the invention will become apparent from consideration of the following description taken in connection with the accompanying drawings.

BRIEF DESCRIPTION OF THE DRAWINGS

FIG. 3 is a wiring diagram of the apparatus of FIG. 1.

DESCRIPTION OF THE PREFERRED EMBODIMENT

Figure 1:
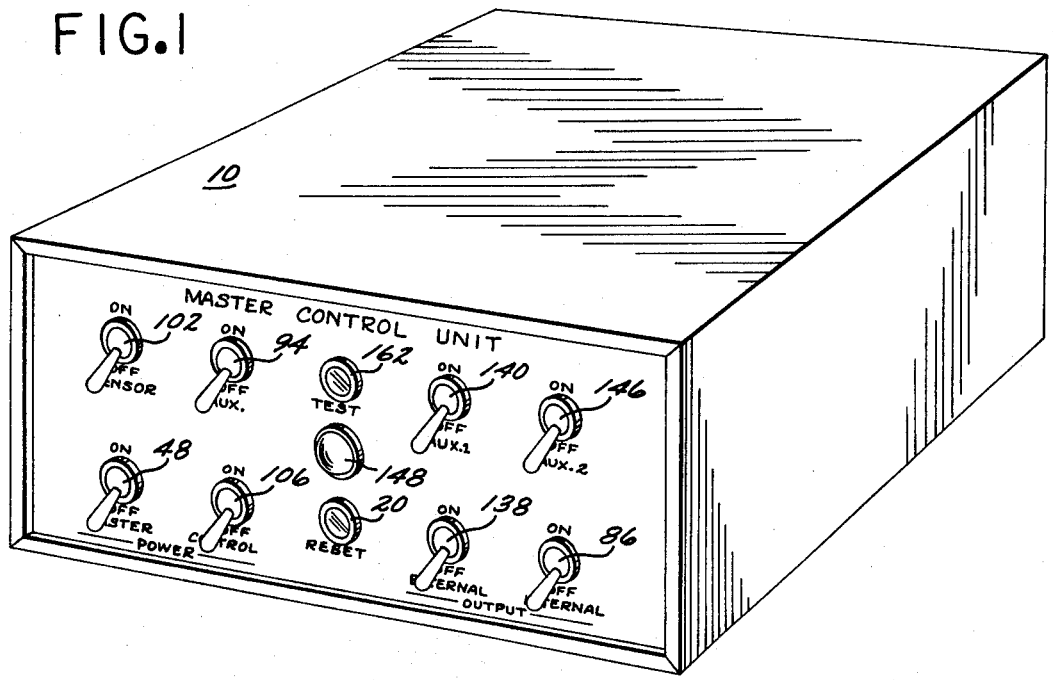
FIG. 1 is a perspective view of the condition monitoring apparatus as it would appear in an actual installation.
Figure 2:
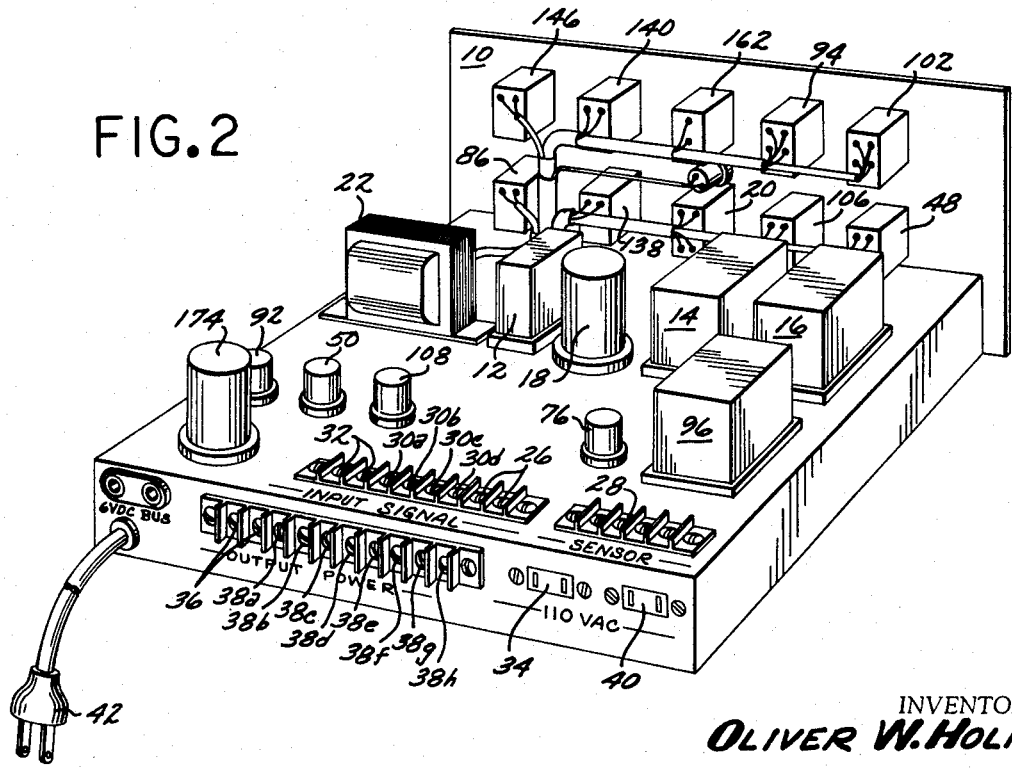
FIG. 2 is a perspective view of the apparatus of FIG. 1 with the cover removed, as viewed from the rear of the panel.

Referring now to the drawings, there is illustrated a condition monitoring apparatus 10 according to the present invention and comprising, generally, a magnetic latching relay 12 which is actuable to provide power to a pair of control relays 14 and 16. The control relay 14 is de-energizable by a time delay relay 18 after a predetermined time interval, while the control relay 16 is de-energizable only upon operation of a reset means or switch 20.

The monitoring apparatus 10 includes a usual and conventional power supply 22, which is augmented during an emergency condition by a battery 24. As will be seen, the various inputs to the present apparatus 10 are applied to input terminal boards 26, 28, 30 and 32 for control by the apparatus 10 of various output or output devices (not shown) coupled to output terminal boards 34, 36, 38 and 40.

More particularly, the apparatus 10 derives power from a usual 110-volt AC receptacle (not shown) into which a plug 42 is inserted. A pair of lead wires 44 and 46 connect the plug 42 to a pair of switch arms comprising a master switch 48. The lead wire 44 includes a current limiting fuse 50 to provide overload protection for the power source.

When the switch arms of the double pole, single throw master switch 48 are moved to their closed positions, 110-volt AC power is provided to the power supply 22 through leads 52 and 54. The power supply 22 comprises a step-down transformer and rectifier which converts the 110-volt alternating current to 12-volt alternating current at a pair of terminals 56 and 58; 6-volt direct current at a pair of terminals 60 and 62; and 6-volt alternating current at a pair of terminals 64 and 66.

110-VOLT AC CIRCUITRY

The 110-volt alternating current coming from the master switch 48 is carried by a pair of leads 68 and 70 to the output terminal board 34, and a pair of leads 72 and 74 also carry 110-volt alternating current from the master switch 48 to the output terminal board 40. The lead 74 includes a current limiting fuse 76 and is routed through a pair of normally open contacts which are closable by a switch arm 78 of the three pole, single throw, normally open control relay 16. With this arrangement, the terminal board 40 may be used for attachment of area lighting or similar devices which are operated by 110-volt alternating current. The output terminal board 34 can be used for connection to an independent 110-volt AC powered detection or sensor unit, such as a photo electric apparatus or the like, with on-off control of this equipment being provided by the master switch 48.

6-VOLT AC CIRCUITRY

The 6-volt AC terminals 64 and 66 are connected by a pair of leads 80 and 82 to the output terminal board 36. The lead 80 is routed through a pair of contacts closable by a switch arm 84 forming a part of the three pole, single throw, normally open control relay 14. This lead also includes a separate pair of contacts which are closed by an internal control switch 86. The switch 86 enables whatever output device is connected to the output terminal board 36 to be disconnected from the circuit at any time and, as will be seen, the present apparatus is also operative to deactuate or turn off such an output device after elapse of a predetermined time interval. This is accomplished by the time delay relay 18 which controls closure of the switch arm 84 of the circuit of the output board 36.

12-VOLT AC CIRCUITRY

The 12-volt AC terminals 56 and 58 are connected to the input terminal board 26 by a pair of leads 88 and 90, the lead 88 including a current limiting fuse 92. The other lead 90 is routed through a relay coil 96 and then through a pair of contacts closable by one switch arm of a double pole, single throw auxiliary input control switch 94. As will be seen, once the apparatus 10 is turned on, the switch associated with the relay coil 96 is normally closed. The input terminals at the board 26 are adapted for connection of remotely located, normally closed monitoring switches or the like (not shown) so that when one of such monitoring switches is opened, the relay coil 96 is de-energized, as will be seen.

Twelve-volt alternating current is also provided to a pair of terminals 28a and 28b of the input terminal board 28 by a pair of leads 98 and 100 connected, respectively, to the leads 88 and 90. The lead 100 includes a pair of contacts which are closable by one switch arm of a double pole, single throw sensor control switch 102. The pair of output terminals 28a and 28b connected to the leads 98 and 100 are adapted for connection as a 12-volt AC power source to independent detec-

6-VOLT DC CIRCUITRY

With respect to the 6-volt DC power supply terminals 60 and 62, a lead 104 is connected to the terminal 60 and is routed through one switch arm of a double pole, single throw control switch 106 and a current limiting fuse 108 to one switch arm 109 of a double pole, double throw reset switch 20. The switch arms of the switch 20 are normally in the positions illustrated, with the switch arm 109 in engagement with a contact of the reset switch 20 to provide power through a lead 107 to one side of a relay coil 110 of the double pole, double throw magnetic latching relay 12. The other side of the coil 110 is connected by a lead 111 to the normally open contact of the switch arm 109. This normally open contact prevents completion of the circuit to ground, and the coil 110 is therefore not energized even when the switch 48 is closed. As will be seen, energization of the coil 110 must occur before any of the alarms or like output devices connected to the output terminals can be actuated. In effect, energization of the coil 110 constitutes actuation of the present apparatus 10.

The ground side of the relay coil 110 is connected to a lead 160, which is in parallel with the lead 111, and the lead 160 is connected to a lead 168 which in turn is connected to a terminal 30b of the input terminal board 30.

A suitable input device, such as a normally open reed switch or the like (not shown), can be connected across the terminal 30b and an adjacent terminal 30a, or a plurality of such switches can be connected in parallel across the terminals 30a and 30b.

The terminal 30a is connected by leads 164 and 154 to a reset switch contact normally closed by a switch arm 152. A lead 150 completes the circuit to ground. As will be seen, whenever one of the normally open input devices connected across the terminals 30a and 30b is closed, the coil 110 of the magnetic latching relay 12 is energized and the monitoring apparatus 10 is actuated to operate the various output devices.

Closure of the input devices across the terminals 30a and 30b is one method by which the present apparatus 10 is actuated. Another method of actuating the apparatus is by closure of a normally open test switch 162 connected across the leads 154 and 160 of the circuit just described. As will be seen, the test switch 162 is momentarily closed to actuate the monitoring apparatus 10 and thereby establish that it is in working order.

Another method of actuating the apparatus 10 is by closure of normally open input devices such as switches (not shown) connected across the terminals 30c and 30d of the input terminal board 30. Such a device, either alone or in parallel with similar normally open devices, is operative upon closure to complete a circuit through a pair of leads 166 and 170, a pair of leads 164 and 168, and a pair of leads 154 and 160, to energize the coil 110.

A further circuit for energizing the coil 110 is provided by a pair of leads 176 and 172 connected in parallel with the leads 154 and 160, and also connected to the normally open contacts of the bi-metallic switch of a timer relay 174. The bi-metallic switch arm is adapted for closure after a predetermined time interval through the heating effect of the heat resistor of the timer relay 174. One side of the heat resistor is connected by a lead 182 in parallel with a lead 112, which in turn is connected in parallel with the 6-volt DC lead 104. The other side of the heat resistor is connected by a lead 184 to one of a pair of terminals of the input terminal board 32, the other terminal being connected to ground. A suitable input device such as a door switch (not shown) is connected across the terminals of the input board. Such switches are readily available, and comprise a normally closed switch arm mounted in the door jamb, and maintained open by a magnet mounted in the edge of the door. When the door is opened, the magnet is no longer effective to keep the switch open, and consequently the circuit is closed across the terminals of the board 32 to ground. This energizes the heating resistor of the relay 174 and, after a predetermined interval of 10 seconds, for example, the heating effect of the resistor causes the bi-metallic switch arm of the relay 174 to close. This energizes the coil 110 of the magnetic latching relay 12 and, as will be seen, thereby effects actuation of the output devices of the present apparatus 10. Relay 174 is provided as a convenient means to permit the house occupant to momentarily open his front door for entry without actuating the apparatus 10.

Yet another method of energizing the coil 110 to actuate the present apparatus is provided by an input device (not shown) connected across the terminals 28c and 28d of the input terminal board 28. An input device suitable for this purpose is a commercially available photo electric alarm system of the type which includes a light unit powered by either 110 or 12 volt alternating current, and a receiver unit powered by either 110, 12 or 6 volt alternating current, or 6 volt direct current, and incorporating a pair of contacts closable to apply either a 6-volt AC or 6-volt DC pulse to a relay or the like. The contacts are closed by virtue of interruption of the beam between the light unit and receiver unit, and the relay is generally associated with an alarm bell or similar device. Such a photo electric relay system can be energized by either connection across the 110-volt AC terminals of terminal board 34, or connection across the 12-volt AC terminals 28a and 28b of the terminal board 28, as required. Either the 6-volt AC or 6-volt DC current pulse which is ordinarily applied to the alarm relay is utilized in the present apparatus 10 to energize the coil 110. Thus, the coil 110 can be energized independently of any current from the power supply 22. This is an example of how any independent sensor system capable of providing either a 6-volt AC or a 6-volt DC pulse of current can be used in the present apparatus to energize the coil 110 and thereby operate the various output devices connected to the output terminal boards. In such an arrangement the current pulse from the system across the terminals 28c and 28d passes from the terminal 28c through a diode 158, through one of the switch arms of the sensor control switch 102 (assuming the switch is then closed), and through a lead 100 to the lead 107 that is connected to one side of the coil 110. The other side of the coil 110 is connected by the lead 160 and a lead 161 to the other input terminal 28d thereby energizing the coil 110.

Yet another circuit for energizing the coil 110 is provided by a lead 178 connected in parallel with the lead 154 and connected to a contact which is closed when the auxiliary input control switch 94 is closed. From switch 94 the circuit continues through a lead 180 to a switch contact of the coil relay 96. As will be seen, the coil of the relay 96 is normally energized when the apparatus 10 is turned on. Accordingly, the associated relay switch is normally open, preventing completion of the circuit from the lead 180 to leads 182 and 160. However, if any of the normally closed switches previously mentioned as connected in series across the terminals of the input terminal board 26 are opened, the coil of the relay 96 will be de-energized, allowing the associated switch arm to close and complete the circuit through the lead 182 to thereby energize the coil 110 and actuate the monitoring apparatus 10.

From the foregoing it will be apparent that the present apparatus 10 can be actuated in a variety of ways, such as by a current pulse from an independent system such as a photo electric relay device; by the opening of normally closed switches; by the closing of normally open switches; by a test switch; and also by a door switch or the like operating through a time delay device. This versatility in responding to input devices is matched by the versatility of the apparatus 10 for actuating various output devices, as will be seen.

CIRCUITRY ACTUATED BY COIL 110

The lead 112 which is connected to the lead 104 carried 6-volt direct current to two pairs of contacts which are closable by a pair of switch arms 114 and 116 of the latching relay 12. One of these switch arms 116 is connected by a lead 118 to one side of a heat resistor 120 of the time delay relay 18. The other side of the heat resistor 120 is connected to ground. The other switch arm 114 is connected by a lead 122 to one side of a relay coil 124 of the control relay 16, the other side of the coil 124 being connected to ground.

A bi-metallic switch arm 126 of the time delay relay 18 is connected in parallel with the lead 122 by a lead 128, while the contact normally closed by the switch arm 126 is connected by a lead 130 to one side of a relay coil 132 of the control relay 14. The other side of the coil 132 is connected to ground.

The lead 112 is also connected through a pair of switch arms 134 and 136 of the control relay 14, and through a pair of switch arms 138 and 140 to a pair of terminals 38b and 38d on the output terminal board 38. In addition, the 6-volt DC power at the lead 112 is carried through a pair of switch arms 142 and 144 of the control relay 16 to a pair of terminals 38f and 38h on the output terminal board 38. The circuit from the switch arm 142 to the terminal 38f includes a switch arm 146, while the circuit to the terminal 38h includes a panel indicator light 148 which is connected to ground.

RESET SWITCH CIRCUITRY

The contact of the reset switch 20 which is normally closed by the switch arm 109 is connected by a lead 156 to another reset switch contact which is normally open, but closable by the switch arm 152 on resetting of the switch 20 to complete the circuit to ground. On such resetting the switch arms 109 and 152 would be moved to positions opposite those illustrated in FIG. 3, applying current through lead 111 to one side of the coil 110, the opposite side of the coil 110 being connected to ground through leads 107, 156, and 150.

Typically, the reset switch 20 is used to move the switch arms 114 and 116 to the open positions illustrated after the coil 110 has been energized by actuation of one of the input devices. Resetting of the switch 20 causes reversal of the direction of current flow through the coil 110, which causes the switch arms 114 and 116 to move in their open positions. This, in turn, cuts off the flow of current to the output devices connected to the terminal boards 36, 38 and 40.

GROUND AND BATTERY CIRCUITS

The 6-volt DC ground bus from power supply terminal 62 is connected by a lead 160 to ground, and consequently to the ground return terminals on the output terminal boards, including the terminals 38a, 38c, 38e and 38g on the board 38, the input terminal boards 32, and the relay coils 14, 16 and 18.

The lead 186 connects one of the arms of the control switch 106 to the positive terminal of the battery 24, the other terminal being connected to ground. This supplies power to the 6-volt DC terminal 60 in the event of any failure of the power supply 22. The lead 186 also supplies battery charging current to the battery 24 when the apparatus 10 is turned on.

OPERATION

In the following description of the apparatus 10 it is assumed that various exemplary input devices are connected to the input boards 26, 28, 30 and 32. More particularly, a plurality of normally closed reed switches are connected in series across the terminals of board 26. A photo electric relay receiver is connected across the input terminals 28a and 28b for energization, and the internal relay contacts of the receiver are connected across the input terminals 28c and 28d to provide a current pulse on actuation of the receiver. A normally open switch or plurality of parallel connected normally open switches are connected across the input terminals 30a and 30b and similar switches are connected across the terminals 30c and 30d. A normally open door switch is connected across the terminals of the input board 32.

Also not shown, but mentioned by way of example, are commonly available output devices which could be connected to the output terminals of the apparatus 10. Thus, the terminals of the output board 34 can be utilized to provide power for the light unit of the photo electric relay sensor system previously mentioned, a 6-volt AC buzzer can be connected across the terminals of the board 36, and a 6-volt DC relay can be connected across the terminals 38a and 38b for actuating an outdoor bell or the like. In addition, a 6-volt DC relay can be connected across the terminals 38c and 38d for actuating a buzzer located in the house of a neighbor, for example, and a 6-volt DC relay can be connected across the terminals 38e and 38f for actuating outside lights. A 6-volt DC exteriorly located indicator light can be connected across the terminals 38g and 38h, and an inside floor lamp can be connected across the terminals of the board 40. The input and output components mentioned are merely exemplary and intended to show typical equipment with which the present apparatus can be associated.

In operation of the monitoring apparatus 10, the plug 42 is inserted into a convenient power receptacle (not shown), the master switch 48 is moved from the open position illustrated to a closed position, providing 6-volt alternating current, 12-volt alternating current, and 6-volt direct current at the terminals of the power supply 22. Next, the sensor switch 102 is closed, and the auxiliary switch 94 is closed. Twelve-volt alternating current is then applied to the board 26, completing a circuit through the normally closed switches assumed to be connected to board 26. This energizes the coil of the relay 96 and opens the switch arm of the relay 96 to thereby open the circuit which would otherwise energize the coil 110. Once the apparatus 10 is completely turned on and ready for activation, as will be seen, opening of any of these normally closed switches, as by unauthorized entry through a window associated with such a switch, will cause the relay 96 to become de-energized, closing the relay switch and energizing the coil 110.

In turning on the apparatus 10, the control switch 106 is then closed. This energizes the circuits to input terminals 28c, 28d, 30a, 30b, 30c and 30d, and the terminals of the board 32, so that closure of the circuits across any of those terminals is effective to energize the coil 110. Next, the switches 86, 138, 140 and 146 to the output devices are closed.

As previously indicated, energization of the coil 110 causes completion of circuits to the output devices. The devices attached to output terminal board 40, and to output terminals 38e, 38f, 38g and 38h, remain energized until the reset switch 20 is operated to open the contacts of the relay 16. However, those output devices connected to terminal board 36 and to output terminals 38a, 38b, 38c and 38d remain energized only for a short period of time, such as for about 2 minutes, after which the heating resistor 20 heats the bi-metallic switch arm 126 enough to move it to an open position. This interrupts the current to the relay coil 132, opening the relay switch arms 84, 134 and 136.

Operation of the latching relay 12, as well known to those skilled in the art, is such that the initial energization of coil 110 causes the switch arms 114 and 116 to be held in their closed positions until current is applied to the coil 110 in a reverse direction. When the user of the apparatus wants to de-energize the output devices that are still on, he operates the reset switch 20 to reverse the current flow through the coil 110, as previously mentioned. The apparatus 10 is now ready for re-activation.

From the foregoing, it is seen that the present apparatus 10 is designed for multi-purpose use, providing for monitoring of switches which are normally open, switches which are normally closed, for monitoring independent systems such as photo electric relay sensor systems, and for monitoring switches through time delay devices so as to preclude activation of the apparatus 10 until a predetermined time interval has elapsed. The apparatus 10 also includes a means to disconnect or de-energize certain output alarm or indicator devices after elapse of a predetermined time period, while maintaining other output devices energized until a reset switch is actuated. Further, the apparatus 10 includes various input and output control switches enabling selection of the input and output circuits to be utilized.

Various modifications and changes may be made with regard to the foregoing detailed description without departing from the spirit of the invention.

I claim:

1. Condition monitoring apparatus for actuating monitoring devices responsive to condition change sensors, said apparatus comprising:

a plurality of input terminals for attachment of condition change sensors in an open circuit state, said sensors assuming a closed circuit state in response to a predetermined condition change;

a latching relay including a latching coil and latching switch means in an open circuit state;

power supply means;

a first latching coil circuit including said power supply means, said latching coil, and said input terminals connected in series whereby assumption of said closed circuit state by said sensors energizes said latching coil to place said latching switch means in a closed circuit state;

a first control relay including a first control coil and first control switch means in an open circuit state;

a second control relay including a second control coil and second control switch means in an open circuit state;

time delay switch means in a closed circuit state and operative a predetermined time interval subsequent energization to assume an open circuit state;

a first control relay circuit including said power supply means, said latching switch means, said time delay switch means, and said first control coil connected in series whereby assumption of said closed circuit state by said latching switch means energizes said first control coil to place said first control switch means in a closed circuit state for said predetermined time interval;

a second control relay circuit including said power supply means, said latching switch means, and said second control coil connected in series whereby assumption of said closed circuit state by said latching switch means energizes said second control coil to place said second control switch means in a closed circuit state;

a plurality of output terminals for attachment of said monitoring devices;

a first control switch circuit including said power supply means, said first control switch means, and certain of said output terminals connected in series whereby assumption of said closed circuit state by said first control switch means actuates certain of said monitoring devices; and a second control switch circuit including said power supply means, said second control switch means, and certain others of said output terminals connected in series whereby assumption of said closed circuit state by said second control switch means actuates certain others of said monitoring devices.

2. Condition monitoring apparatus according to claim 1 and including a second plurality of input terminals for attachment of second condition change sensors in a closed circuit state, said sensors assuming an open circuit state in response to a predetermined condition change;

an auxiliary relay having an auxiliary coil and auxiliary switching means in an open circuit state;

an auxiliary coil circuit including said auxiliary coil, said power supply means and said second plurality of input terminals connected in series to energize said auxiliary coil whereby assumption of said open circuit state by said second condition change sensors de-energizes said auxiliary coil to place said auxiliary switching means in a closed circuit state; and an auxiliary switch circuit including said auxiliary switch means and connected in parallel with said first latching coil circuit whereby said latching coil is energized upon assumption of said closed circuit state by said auxiliary switching means.

3. Condition monitoring apparatus according to claim 1 wherein said latching coil circuit includes reset means connected in series with said latching coil and operative in a reset state to reverse the direction of current flow through said latching coil to place said latching switch means in an open circuit state.

4. Condition monitoring apparatus according to claim 1 and including a third plurality of input terminals for attachment of third condition change sensor means in a closed circuit state, said third sensor means assuming an open circuit state in response to a predetermined condition change;

a time delay relay including delay heating means and heat responsive delay switch means in an open circuit state;

a delay heating means circuit including said delay heating means, said power supply means and said third plurality of input terminals connected in series to energize said heating means and thereby maintain said delay switch means in said open circuit state whereby assumption of said open circuit state by said third condition change sensor means de-energizes said delay heating means and allows said delay switch means to assume a closed circuit state; and a delay switch circuit including said delay switch means and connected in parallel with said first latching coil circuit whereby said latching coil is energized upon assumption of said closed circuit state by said delay switch means.

5. Condition monitoring apparatus according to claim 1 and including a fourth plurality of input terminals for attachment of fourth condition change sensor means adapted to provide a current pulse in response to a predetermined condition change; and a fourth circuit in series with said fourth plurality of input terminals and connected in parallel with said first latching coil circuit whereby said latching coil is energizable by said current pulse independently of said power supply means.

6. Condition monitoring apparatus for actuating monitoring devices responsive to condition change sensors, said apparatus comprising:

a plurality of input terminals for attachment of condition change sensors for operation in response to a predetermined condition change;

latching relay means including a latching coil and latching switch means operative in response to operation of said latching coil;

power supply means;

a first latching coil circuit including a series connection of said power supply means, said latching coil, and said input terminals whereby said latching coil is operative in response to operation of said sensors;

first control relay means including a first control coil and first control switch means operative in response to operation of said first control coil;

second control relay means including a second control coil and second control switch means operative in response to operation of said second control coil;

time delay switch means;

a first control relay circuit including a series connection of said power supply means, said latching switch means, said time delay switch means, and said first control coil whereby operation of said latching switch means operates said first control coil to operate said first control switch means, the duration of said operation of said first control switch means being under the control of said time delay switch means;

a second control relay circuit including a series connection of said power supply means, said latching switch means, and said second control coil whereby operation of said latching switch means operates said second control coil to operate said second control switch means;

a plurality of output terminals for attachment of said monitoring devices;

a first control switch circuit including a series connection of said power supply means, said first control switch means, and certain of said output terminals whereby operation of said first control switch means is adapted to actuate certain of said monitoring devices; and a second control switch circuit including a series connection of said power supply means, said second control switch means, and certain others of said output terminals whereby operation of said second control switch means is adapted to actuate certain others of said monitoring devices.

* * * * *